US012423680B1

(12) United States Patent
Vincent et al.

(10) Patent No.: US 12,423,680 B1
(45) Date of Patent: Sep. 23, 2025

(54) GAMING PLATFORM ARCHITECTURE

(71) Applicant: FanDuel Limited, Edinburgh (GB)

(72) Inventors: Matthew Vincent, London (GB); Dan Deac, Cluj (RO)

(73) Assignee: FanDuel Limited, Edinburg (GB)

( * ) Notice: Subject to any disclaimer, the term of this patent is extended or adjusted under 35 U.S.C. 154(b) by 0 days.

(21) Appl. No.: 18/775,752

(22) Filed: Jul. 17, 2024

(51) Int. Cl.
*G06Q 20/36* (2012.01)
*G06Q 50/34* (2012.01)
*G07F 17/32* (2006.01)

(52) U.S. Cl.
CPC ......... *G06Q 20/3674* (2013.01); *G06Q 50/34* (2013.01); *G07F 17/3237* (2013.01); *G07F 17/3244* (2013.01)

(58) Field of Classification Search
CPC ............... G06Q 20/3674; G06Q 50/34; G07F 17/3237; G07F 17/3244
USPC ......................................................... 705/44
See application file for complete search history.

(56) References Cited

U.S. PATENT DOCUMENTS

| 10,943,432 | B2 * | 3/2021 | Cage | G07F 17/3244 |
| 12,190,300 | B1 * | 1/2025 | Bowers | G06Q 20/3223 |
| 2017/0001112 | A1 * | 1/2017 | Gilmore | A63F 13/49 |
| 2021/0218686 | A1 * | 7/2021 | Galeev | H04L 43/0852 |

OTHER PUBLICATIONS

Liu, Q., 2018. Integrating Game Engines into the Mobile Cloud as Micro-services (Doctoral dissertation, University of Saskatchewan). (Year: 2018).*

* cited by examiner

*Primary Examiner* — Sara C Hamilton
(74) *Attorney, Agent, or Firm* — Erise IP, P.A.

(57) ABSTRACT

Systems, methods, and computer-readable media for processing transactions utilizing a gaming system, where the transactions are initiated by game providers. The system may include a remote gaming server, a remote gaming server bridge, a gaming system, an eligibility verifier, a wallet, an event generator, an event publisher, a session manager, an alert system, and a pendings fixer. The remote gaming server may transmit a request (e.g., a transaction) to the gaming system, where the remote gaming server bridge may translate the request such that it is processable and understandable by the gaming system. The wallet may update an account associated with the user, including by depositing a sum or withdrawing the sum from the account. The event generator may generate a system event associated with the transaction, and the event publisher may publish the system event to a data store.

20 Claims, 5 Drawing Sheets

GAMING PLATFORM ARCHITECTURE

BACKGROUND

1. Field

Embodiments of the present disclosure relate to gaming platforms. More specifically, embodiments of the present disclosure relate to facilitating third party access via a gaming platform

2. Related Art

Gaming platforms often desire to provide a wide range of games, as doing so ensures that the platform covers a wide range of users and user interests. As such, a gaming platform may collaborate with game providers to expand the library of games the gaming platform is able to provide to users. As a result, gaming providers may need to access the backend services of a gaming platform, such as the gaming platform wallet including the accounts associated with users of the gaming platform. Thus, gaming platforms may provide robust architecture to facilitate the transactions between game providers and backend services.

Additionally, gaming platforms are often subject to regulation, resulting in the need to obtain jurisdictional approval for many services and functionalities of the gaming platform in a large array of jurisdictions. Obtaining regulatory approval can take a significant amount of time for gaming platforms operable to facilitate transactions between game providers and backend services. As such, it may be time-consuming and expensive to update one or more components of a gaming platform offering backend access to game providers, because the platform may need to seek regulatory approval in a large number of jurisdictions upon updating singular components of the gaming platform. Further, if a single component of a given platform is updated, the entire platform may be inaccessible for the time in which it takes to seek regulatory approval. Thus, there is a need for systems and methods for providing a gaming platform for facilitating transactions between game providers and backend systems in a microservices model, where each microservice may be updated independently from every other microservice.

SUMMARY

In some aspects, the techniques described herein relate to a system for processing a transaction initiated by a game provider, the system including: a gaming system operable to facilitate processing of the transaction; a remote gaming server associated with the game provider; a remote gaming server bridge operable to translate the transaction transmitted by the remote gaming server to the gaming system; an eligibility verifier configured to verify the transaction satisfies a plurality of eligibility requirements; and a wallet configured to access and update an account associated with a user.

In some aspects, the techniques described herein relate to a system, wherein the remote gaming server bridge is operable to translate a communication transmitted by the gaming system to the remote gaming server.

In some aspects, the techniques described herein relate to a system, wherein the transaction includes a request to update the account associated with the user.

In some aspects, the techniques described herein relate to a system, wherein the plurality of eligibility requirements include a minimum balance of the account associated with the user.

In some aspects, the techniques described herein relate to a system, further including: an event generator operable to generate a system event corresponding to the transaction.

In some aspects, the techniques described herein relate to a system, further including: an event publisher operable to publish the system event to a data store.

In some aspects, the techniques described herein relate to a system, further including: a session manager operable to verify a valid session associated with the transaction exists.

In some aspects, the techniques described herein relate to a method for processing a transaction initiated by a game provider, the method including: receiving the transaction; translating the transaction such that it is processable by a gaming system; providing the transaction to the gaming system; verifying a plurality of eligibility requirements are satisfied by the transaction; and updating an account associated with the transaction.

In some aspects, the techniques described herein relate to a method, wherein verifying the plurality of eligibility requirements are satisfied by the transaction includes: analyzing a location of a user associated with the transaction.

In some aspects, the techniques described herein relate to a method, further including: generating a system event corresponding to the transaction; and publishing the system event.

In some aspects, the techniques described herein relate to a method, further including: accessing, in real time, the system event.

In some aspects, the techniques described herein relate to a method, further including: verifying, using the system event, a valid session associated with the transaction exists.

In some aspects, the techniques described herein relate to a method, further including: receiving the transaction from a user interface associated with a user.

In some aspects, the techniques described herein relate to a method, further including: transmitting an indication of a balance associated with the account before the account is updated.

In some aspects, the techniques described herein relate to one or more non-transitory computer-readable media including computer-executable instructions that, when executed by at least one processor, perform a method of processing a transaction initiated by a game provider, the method including: receiving, by a remote gaming server bridge, the transaction; translating the transaction such that it is processable by a gaming system; providing the transaction to the gaming system; verifying a plurality of eligibility requirements are satisfied by the transaction; updating an account associated with the transaction; and generating a system event associated with the transaction.

In some aspects, the techniques described herein relate to one or more non-transitory computer-readable media, wherein updating the account associated with the transaction includes at least one of: depositing a sum into the account; or withdrawing the sum from the account.

In some aspects, the techniques described herein relate to one or more non-transitory computer-readable media, wherein the account is associated with a user of a game provided by the game provider.

In some aspects, the techniques described herein relate to one or more non-transitory computer-readable media, wherein the method further includes: determining, via machine learning, a pending transaction to be cleared; and clearing the pending transaction.

In some aspects, the techniques described herein relate to one or more non-transitory computer-readable media, wherein the method further includes: voiding the pending transaction.

In some aspects, the techniques described herein relate to one or more non-transitory computer-readable media, wherein the remote gaming server bridge is a custom remote gaming server bridge.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
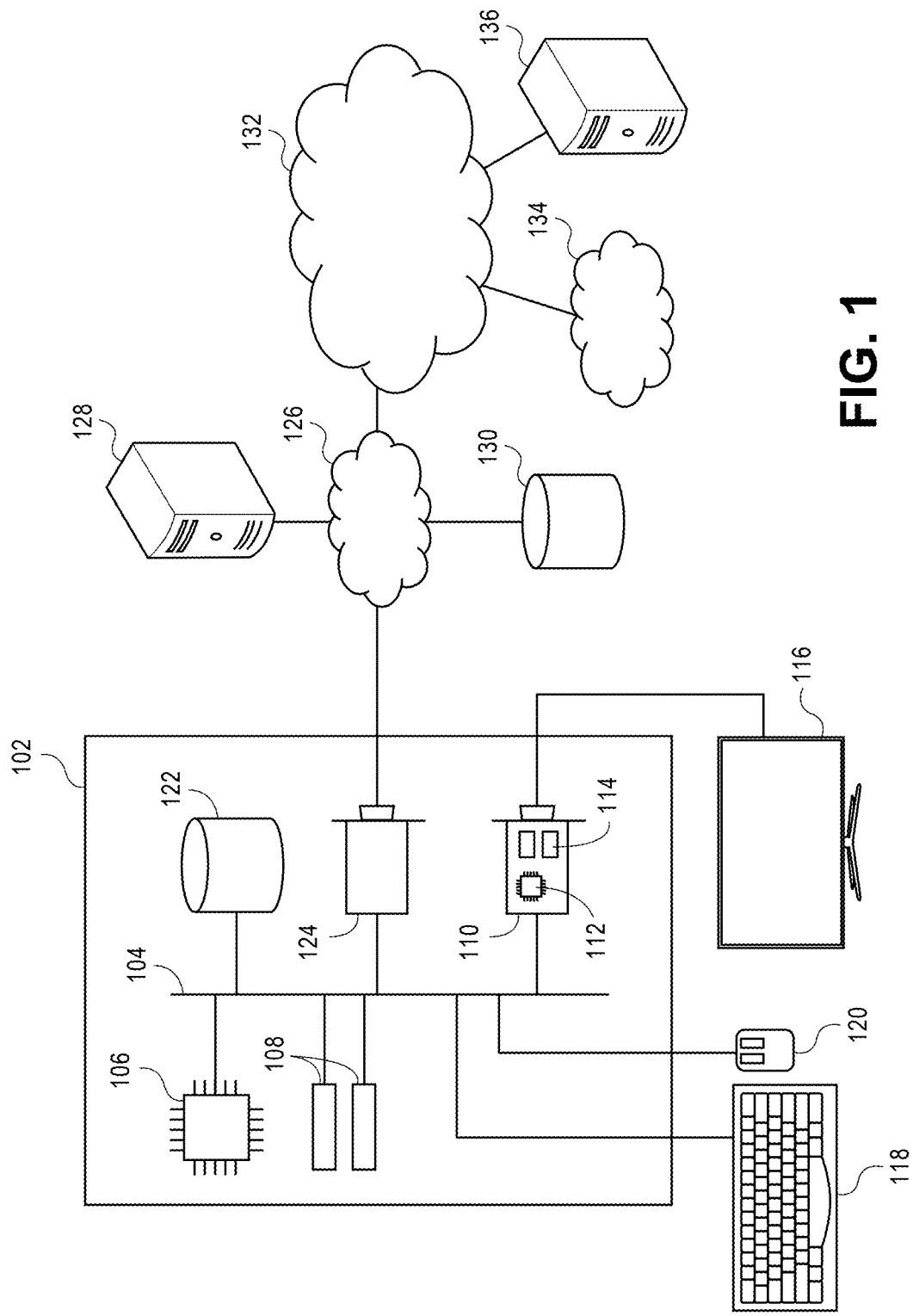
FIG. 1 illustrates an exemplary hardware platform, in accordance with embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Generally, embodiments of the present disclosure relate to systems and methods for processing transactions utilizing a gaming system, where the transactions are initiated by game providers. The system may include a remote gaming server, a remote gaming server bridge, a gaming system, an eligibility verifier, a wallet, an event generator, an event publisher, a session manager, an alert system, and a pendings fixer. The remote gaming server may transmit a request (e.g., a transaction) to the gaming system, where the remote gaming server bridge may translate the request such that it is processable and understandable by the gaming system. The eligibility verifier may verify that the transaction satisfies a plurality of eligibility requirements. The wallet may update an account associated with the user, including by depositing a sum or withdrawing the sum from the account. The event generator may generate a system event associated with the transaction, and the event publisher may publish the system event to a data store. The session manager may verify a valid session associated with the transaction exists. The alert system may indicate when a regulated event has occurred. The pendings fixer may identify pending transactions and clear pending transactions, for example by utilizing machine learning.

FIG. 1 illustrates an exemplary hardware platform relating to some embodiments of the present disclosure. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is, in turn, connected to Internet 132, which connects many networks such as local network 126, remote network 134, or directly attached computers such as computer 136. In some embodiments, computer 102 can itself be directly connected to Internet 132.

Figure 2A:
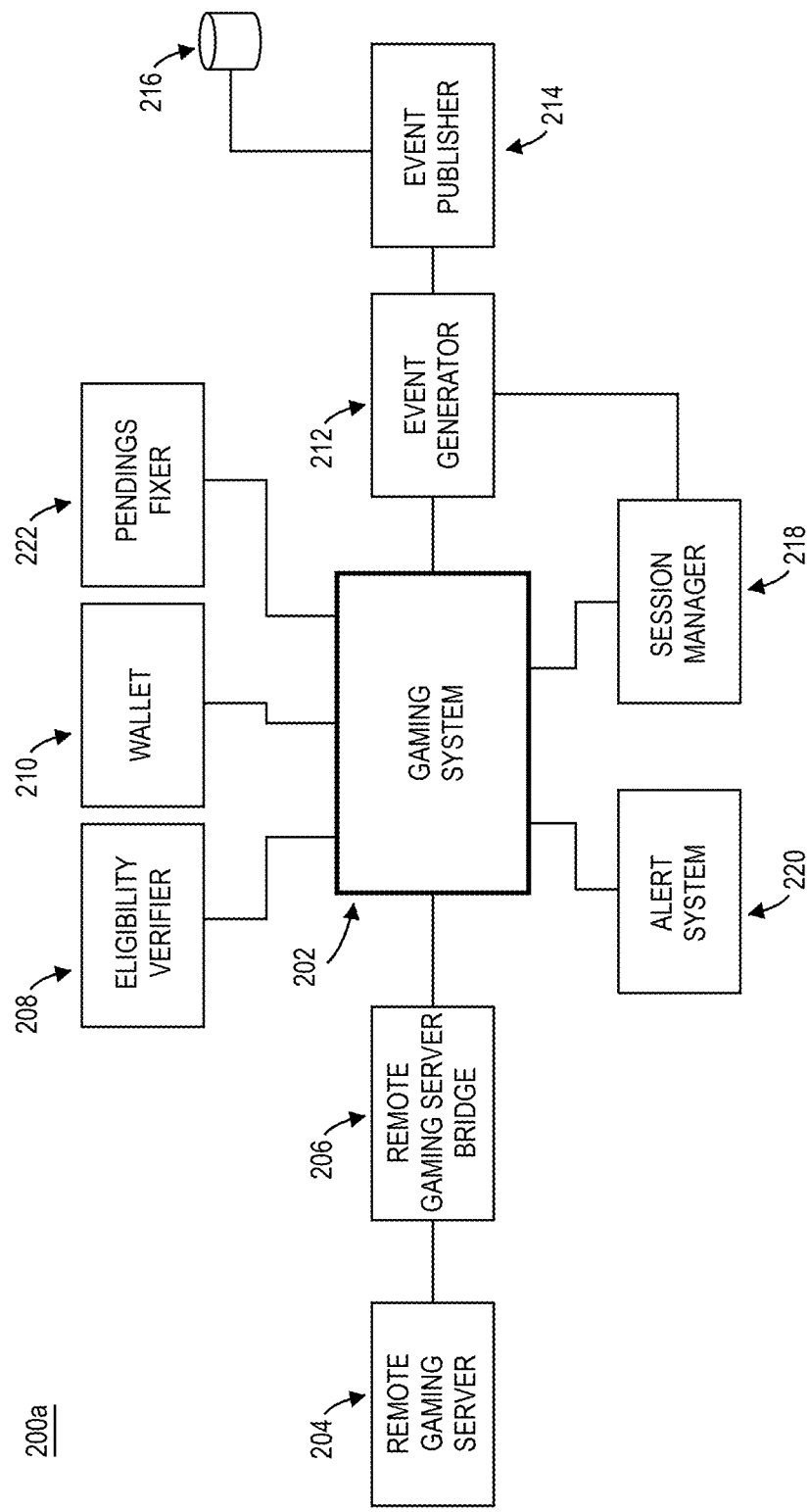
FIG. 2A illustrates an exemplary gaming platform, in accordance with embodiments of the present disclosure.

To begin, FIG. 2A depicts an exemplary gaming platform in accordance with embodiments of the present invention and generally referred to by reference numeral 200a. Broadly, gaming platform 200a may include a plurality of microservices such that the services are agnostic to all other microservices in gaming platform 200a. Accordingly, all microservices in gaming platform 200a may be updated, removed, etc. without affecting any other service within gaming platform 200a. For example, in the event that all microservices within gaming platform 200a need to be certified by a regulatory body, all micro services within gaming platform 200a need not be recertified every time a singular microservice is updated.

In some embodiments, gaming platform 200a includes a gaming system 202. At a high level, gaming system 202 may manage the life cycle of an interaction between a user and a game by facilitating the communications and transactions occurring between a plurality of remote gaming servers and any number of back-end services. For example, gaming system 202 may receive a communication from a remote gaming server requesting access to the account of a user and may facilitate the process of providing access to the remote gaming server. For another example, gaming system 202 may facilitate third party game provider access via a remote gaming server to the financial account of a user or the provider of the gaming platform (e.g., the wallet). For another example, gaming system 202 may facilitate the extraction of money, settlement of wagers, and passing of money back and forth.

In some embodiments, gaming system 202 may receive a request from remote gaming server 204. Remote gaming server 204 may be associated with a third-party game provider. For example, the game provider may provide a plurality of games such that connecting to gaming platform 200a allows the third party provider to provide the plurality of games to users, where the users may place wagers on the games. The games provided by third-party providers may include any games now known or later developed, including, but not limited to, spin-the-wheel games, slot machines, poker, card games, casino games, sports games, and the like. A wager may be a bet made on the occurrence of a particular outcome for a game. Wagers may include any type of currency and/or item of value now known or later developed, including virtual currency and physical currency. As used herein, a wager may encompass other betting mechanisms, including, but not limited to, stake-based games, where funds are deducted from a user's account before engaging in wagering.

Remote gaming server 204 may transmit any number of transactions (e.g., requests) to gaming system 202. Requests remote gaming server 204 may transmit to gaming system 202 include, but are not limited to, requests to extract money, requests to deposit money, indications that a wager has begun, indications that a wager has ended, and similar transactions. An example request may be, "user would like to make a wager of $10. Do they have enough money?"

In some instances, the language used by remote gaming server 204 may differ from the language used by gaming system 202. For example, remote gaming server 204 may speak in terms of "processing" and "play," while gaming system 202 may speak in terms of "debit" and "credit." As such, in some embodiments, remote gaming server bridge 206 may translate the transactions (and other communications) between gaming server 204 and gaming system 202. Remote gaming server bridge 206 may translate a request from the programming language of remote gaming server 204 to the programming language of gaming system 202. Accordingly, gaming system 202 may then process the request and pass back a communication that is then translated by remote gaming server bridge 206 before passing the communication back to remote gaming server 204.

In some embodiments, remote gaming server bridge 206 may include a dictionary to translate between remote gaming server 204 and gaming system 202. Remote gaming server bridge 206 may include a library of components that game providers may utilize to communicate with gaming system 202 through remote gaming server 204. In some embodiments (as discussed below with regard to FIG. 2B), remote gaming server bridge 206 may be a generic bridge or a custom bridge such that a game provider may conform to the generic bridge or communicate through a custom channel designed for the game provider, respectively.

Upon receiving a request from remote gaming server 204, gaming system 202 may interface with any number of microservices to process the request. In some embodiments, gaming system 202 may interface with eligibility verifier 208, which may determine the eligibility of a given transaction. Eligibility verifier 208 may indicate to gaming system 202 whether any number of eligibility requirements are met. Eligibility requirements may include any number of factors that may affect the ability for a wager to be carried out including, but not limited to, the location of a user, a minimum balance of an account associated with the user, the status of an account associated with the user, the balance of a financial account associated with the user, and the like. For example, gaming system 202 may interface with eligibility verifier 208 to determine whether a user is eligible to place a $20 bet. Accordingly, eligibility verifier may analyze an account associated with the user to determine if the user has at least $20 of funds in their account and that the user is located within a region allowing for such bets to be placed.

Upon the determination that a transaction has met or has not met the eligibility requirements, eligibility verifier 208 may indicate the determination of eligibility to gaming system 202. In some embodiments, if eligibility verifier 208 determines a transaction has met the eligibility requirements, gaming system 202 may continue processing the transaction. Gaming system 202, upon receiving an indication from eligibility verifier 208 that the transaction meets the eligibility requirements, may send a communication to remote gaming server 204 indicating that remote gaming server 204 may proceed in a particular way. For example, upon learning that a user has sufficient funds for a $20 bet on a slot machine game, gaming system 202 may notify remote gaming server 204, and the game provider may proceed with displaying a spinning animation to a user.

In some embodiments, gaming system 202 may interface with wallet 210. In some embodiments, wallet 210 may access accounts, including financial accounts, associated with the user of a particular transaction. The accounts accessible by wallet 210 may store anything of value now known or later developed belonging to a user, including, but not limited to, virtual currency, physical currency, cryptocurrency, and the like. Wallet 210 may access financial accounts associated with the business deploying gaming platform 200a such that funds may be deposited and withdrawn from the financial accounts when prompted by a transaction.

Gaming system 202 may interface with wallet 210 in order to debit and or credit any number of accounts associated with users. For example, if a request received from remote gaming server 204 indicates that gaming system 202 should deposit $20 in an account associated with the user, gaming system 202 may interface with wallet 210 in order to initiate the transfer of $20 into the respective account. For another example, if a request received from remote gaming server 204 indicates that a user has lost a wager for $30, gaming system 202 may initiate the transfer of $30 out of the respective account of the user.

In some embodiments, gaming system 202 may interface with event generator 212 to initiate the creation of a system event. System events may provide real-time insight into what transactions are occurring within gaming platform 200a. As such, system events may be utilized to facilitate transaction processing by any number of microservices. For example, as discussed further below, session manager 218 may utilize generated system events to determine whether a particular transaction is valid.

A system event may be a system record of a transaction. For example, an event may be created to indicate that a user made a stake for $20. A system event may be generated each time gaming system 202 processes a transaction. For example, a user betting $20 on a game and then winning the bet may involve two transactions: first, a transaction verifying the user has at least $20 in an associated account; and second, a transaction updating the account associated with the user to reflect the gain of $20. Accordingly, a separate system event may be created for each of the two transactions associated with a user betting $20 on a game and then winning the bet.

In some embodiments, system events may be stored in such a way that they are easily and/or quickly accessible by gaming system 202 and session manager 218. Put another way, system events may be stored in such a way that they are accessible in real time. System events stored in such a way may be associated with active sessions, such as sessions of users who are presently interacting with a game. For example, events stored for quick access may include system events related to wagers that have not yet been completed. For another example, system events stored for quick access may include system events related to a particular user session, the particular user session beginning when a user logs into a particular gaming platform and ending when the user logs out, a predetermined amount of time has passed, or the user is inactive for a predetermined amount of time.

Upon the creation of a system event, event generator 212 may interface with event publisher 214 to publish the system event to data store 216. Data store 216 may include a singular data store or a plurality of data stores. Data store 216 may be internal or it may be external. In some embodiments, data store 216 is a long-term record-keeping system. As such, gaming platform 200a may maintain records of transactions for a predetermined amount of time. Accordingly, gaming platform 200a may conform to record-keeping standards set by any number of regulatory bodies. For example, if a regulatory body requires gaming platform providers to maintain records of all transactions for a period of 20 years, data store 216 may be configured to maintain storage of system events for at least 20 years.

In some embodiments, discussed further below, event publisher 214 may publish system events to alert system 220, where alert system 220 may determine whether an event necessitates an indication to be transmitted to gaming system 202. For example, event publisher 214 may publish all system events that relate to a debiting of a user account to alert system 220, and alert system 220 may send out a high-win notification when the number of system events relating to the debiting of the user account exceeds a predetermined threshold or the amount of a system event exceeds a predetermined threshold. In some embodiments event publisher 214 may publish system events to one or more third parties and/or external systems. For example, event publisher 214 may publish system events to a marketing system such that the marketing system may use the system events to tailor user communications and promotional materials.

In some embodiments, gaming system 202 may interface with session manager 218 to validate the transaction. At a high level, session manager 218 may confirm that a valid session associated with the transaction exists. For example, session manager 218 may verify that a user related to the transaction is logged into the gaming platform before allowing the crediting and/or debiting of an account associated with the user.

Additionally, gaming system 202 may need to receive transactions relating to a given action in a particular order. In some embodiments, session manager 218 may validate a transaction by verifying that a predetermined logical order of transactions has occurred. For example, gaming system 202 may need to receive a transaction requesting an indication of whether a user can bet a certain amount before gaming system 202 receives a transaction requesting the certain amount be withdrawn for an account associated with the user. Accordingly, session manager 218 may verify that the transaction requesting an indication of whether a user can bet a certain amount occurred before validating the transaction requesting the certain amount be withdrawn for an account associated with the user.

In some embodiments, session manager 218 may utilize system events generated by event generator 212 to determine whether a particular transaction is valid. For example, if a transaction requests gaming system 202 to withdraw $400 from a user account, session manager 218 may verify that an event exists indicating the user is participating in a stake or indicating the user lost a wager. In the event that neither of these events exists, session manager 218 may notify gaming system 202 that the request received is invalid.

In some embodiments, gaming system 202 may interface with alert system 220 to indicate one or more behaviors have occurred that necessitate notification to one or more components in gaming platform 200a or one or more external systems. For example, alert system 220 may indicate when a transaction corresponds to a particular user action, such as when a user wins a large sum of money in a casino game. Alert system 220 may indicate when regulated transactions have occurred within a game. For example, alert system 220 may indicate when a particular user has a wager win ratio that exceeds a particular threshold. Accordingly, alert system 220 may transmit an indication of regulated transactions to one or more external regulatory bodies.

In some embodiments, gaming system 202 may interface with pendings fixer 222. Broadly, pendings fixer 222 may close out transactions that have remained pending for a predetermined amount of time and/or have not been closed out. For example, if a user begins a game of blackjack and does not finish the game or close out of the game, gaming system 202 may indefinitely maintain a plurality of events relating to the user's game of blackjack. Accordingly, pendings fixer 222 may clear out the plurality of events relating to the user's game of blackjack when it is determined that the blackjack game will not be finished by the user.

Any number of factors may be utilized to determine whether a particular transaction is to be cleared out, including, but not limited to, whether a predetermined amount of time has been reached, whether a session associated with the user and the transaction is still active, whether the user is logged into an account associated with the user, and the like. Pendings fixer 222 may perform any number of actions in order to clear out a pending transaction, including, but not limited to, marking the transaction as void, settling the transaction as a loss or win, and the like.

In some embodiments, pendings fixer 222 may automatically clear out pending transactions from gaming platform 200a. For example, as described above, pendings fixer 222 may automatically clear out pending transactions that have exceeded a predetermined threshold of time pending. In some embodiments, pendings fixer 222 may utilize one or more machine learning models to determine when transactions are to be cleared out from gaming platform 200a. In such embodiments, the one or more machine learning models may be trained using any suitable training data set, including, but not limited to, previous transaction data sets, previously cleared pending transaction data sets, user behavior data sets, and the like. Pendings fixer 222 may then utilize knowledge of previously cleared transactions to determine when a particular pending transaction may need to be cleared from gaming platform 200a. Additionally, pendings fixer 222 may determine the way in which a pending transaction should be cleared based on how similarly situated transactions have historically been cleared.

Machine learning models utilized by pendings fixer 222 may be any suitable model now known or later developed, including, but not limited to, linear regression, logistic regression, support vector machines, naïve bayes, k-nearest neighbors, boosting algorithms, decision trees, random forest, neural networks, classifiers, reinforcement learning, cluster analysis, k-means clustering, and similar machine learning models.

In some embodiments, pendings fixer 222 may manually clear pending transactions. As such, an administrator of gaming platform 200a may input whether or not to clear a particular pending transaction from the system. Further, the administrator may determine how the pending transaction is cleared from the system, such as by voiding the transaction. An administrator may be any suitable entity now known or later developed for clearing pending transactions, including, but not limited to, a human operator, a system administrator, an external system, a microservice, and the like.

Figure 2B:
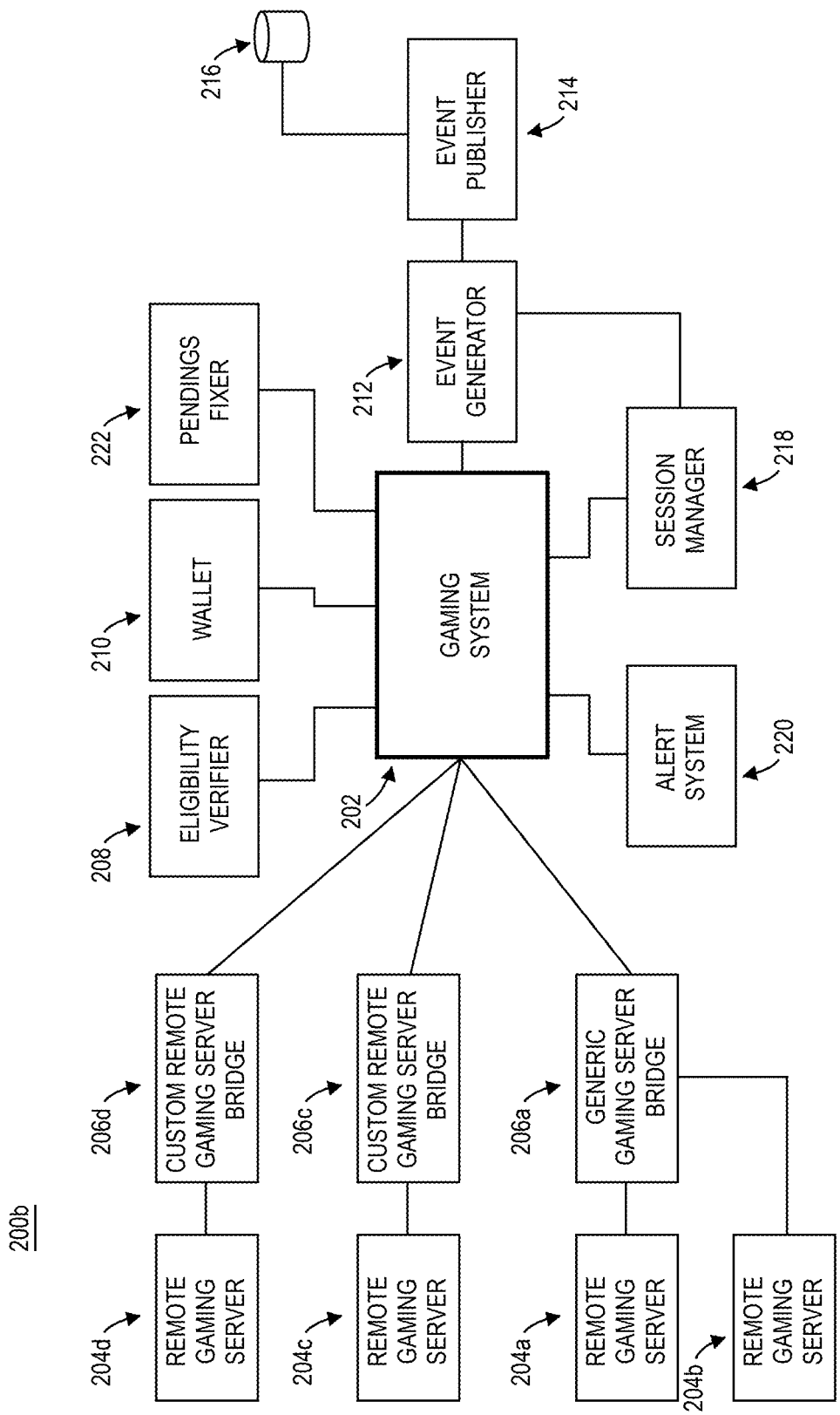
FIG. 2B illustrates an exemplary gaming platform, in accordance with embodiments of the present disclosure.

To continue, FIG. 2B depicts and exemplary gaming platform architecture in accordance with embodiments of the present invention and generally referred to by reference numeral 200b. As discussed above with respect to gaming platform 200a, gaming platform 200b may include a gaming system 202 operable to receive a plurality of requests from a remote gaming server 204. The request and other communications passed between remote gaming server 204 and gaming system 202 may be translated by remote gaming server bridge 206. Gaming system 202 may interface with any number of microservices to facilitate the transaction, including eligibility verifier 208, wallet 210, event generator 212, session manager 218, alert system 220, and pendings fixer 222. Event generator 212 may interface with event publisher 214 to publish generated events to data store 216.

As discussed above with respect to gaming platform 200a, gaming platform 200b may include any number of remote gaming servers and remote gaming server bridges. In some embodiments, as mentioned above with respect to remote gaming server bridge 206, gaming platform 200b may include generic bridges and/or custom bridges. For example, gaming platform 200b may include generic remote gaming server bridge 206a, custom remote gaming server bridge 206c, and custom remote gaming server bridge 206d.

In some embodiments, generic remote gaming server bridge 206a may provide a uniform library for translating between any number of remote gaming servers, including remote gaming server 204a and remote gaming server 204b. Accordingly, game providers may have the ability to offer games to users with accounts associated with gaming platform 200b without constructing a custom remote gaming server bridge by utilizing the generic remote gaming server bridge.

In some embodiments, a remote gaming server may interface with a custom remote gaming server bridge for communicating with gaming system 202. The custom remote gaming server bridge may include a custom library and toolkit for translating the language of a particular remote gaming server to the language of gaming system 202. For example, remote gaming server 204c may have custom remote gaming server bridge 206c and remote gaming server 204d may have custom remote gaming server bridge 206d such that custom remote gaming server bridge 206c differs from custom remote gaming server bridge 206d. Accordingly, a game provider may, in a more efficient manner, provide services to users of their games, given a custom means of communicating with gaming system 202.

Figure 3:
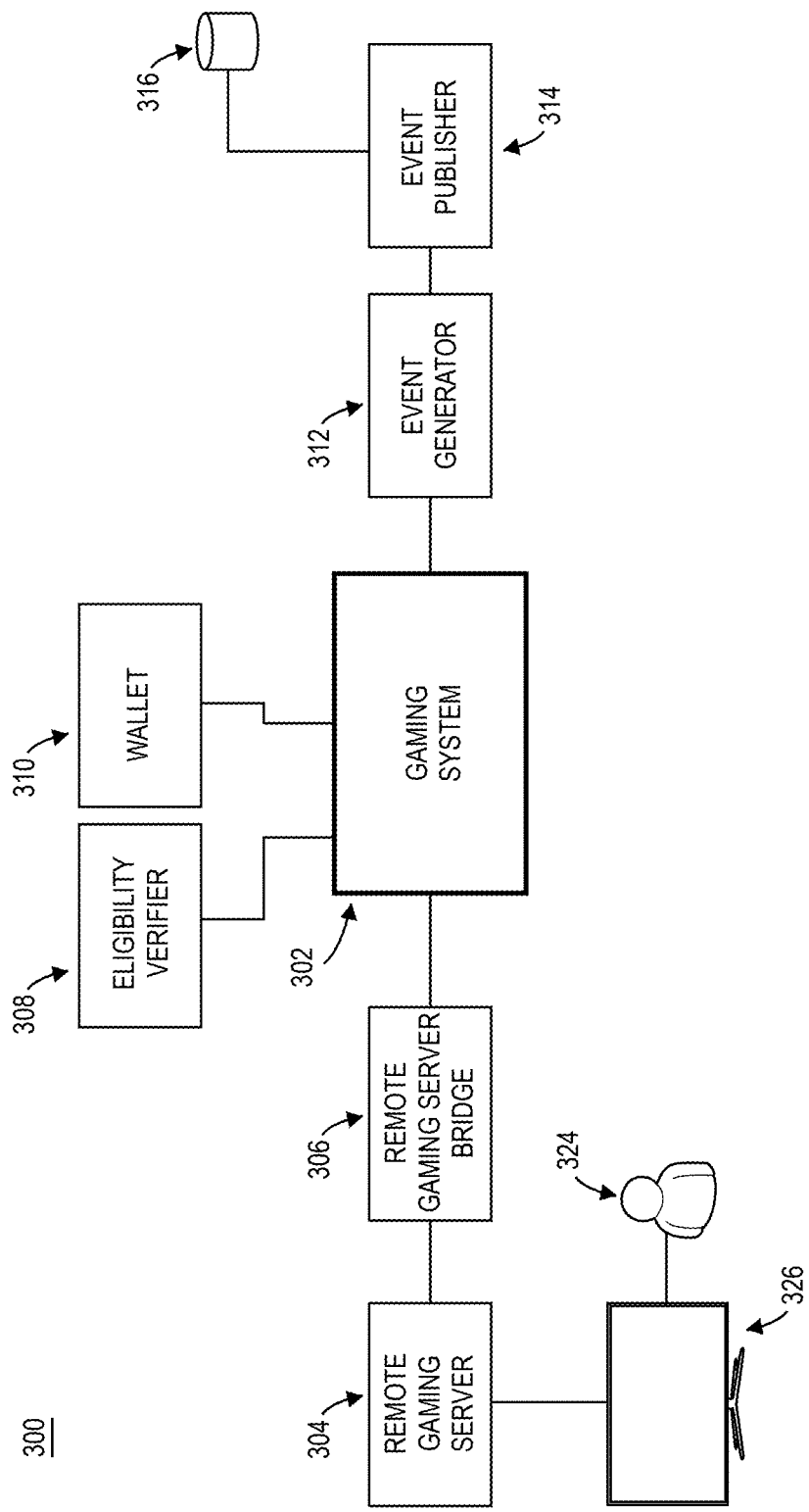
FIG. 3 illustrates an exemplary user interaction with a gaming platform, in accordance with embodiments of the present disclosure.

Continuing on, FIG. 3 illustrates an exemplary user interaction with a gaming platform 300, generally corresponding to gaming platform 200a, in accordance with embodiments of the present disclosure. At a high level, a user 324 may interact with games provided by game providers where the user's interactions with the games result in a plurality of transactions and/or requests being sent to gaming system 302, generally corresponding to gaming system 202 depicted in FIG. 2A. In some embodiments, user 324 interfaces with one or more games utilizing interface 326.

Accordingly, interface 326 may transmit one or more requests to remote gaming server 304, generally corresponding to remote gaming server 204 depicted in FIG. 2A, where the one or more requests correspond to one or more user inputs and/or actions. For example, user 324 may input into interface 326 that they wish to bet a certain amount on a slot machine game provided by a game provider. As such, a request to determine if user 324 has sufficient funds may be transmitted from interface 326.

In some embodiments, the request transmitted from interface 326 is then received by remote gaming server 304. Remote gaming server 304 may then pass the request to remote gaming server bridge 306, generally corresponding to remote gaming server bridge 206 depicted in FIG. 2A. In some embodiments, as discussed above with respect to remote gaming server bridge 206, remote gaming server bridge 306 may translate the request from the language understood by remote gaming server 304 to language understood by gaming system 302 and the various microservices gaming system 202 interfaces with. For example, remote gaming server 304 may change a request to "check if $20 can be withdrawn from an account associated with user 324" to "check if $20 can be credited to an account associated with user 324," where the former cannot be understood by gaming system 302 but the latter can be understood by gaming system 302. Upon translating the request, remote gaming server bridge 306 may then transmit the request to gaming system 302.

Upon receiving the request, gaming system 302 may interface with eligibility verifier 308, generally corresponding to eligibility verifier 208 depicted in FIG. 3, to determine if the request meets one or more eligibility requirements. In some embodiments, eligibility verifier 308 may verify whether one or more eligibility requirements are met by the request. For example, eligibility verifier 308 may analyze the location of user 324 to determine whether the location of user 324 permits the type of activity indicated by the request, such as whether or not it is legal to participate in online gambling in the region where user 324 is located. For another example, eligibility verifier 308 may analyze whether the account associated with user 324 is in good standing, such as if they have accepted the terms and conditions of the gaming platform. For still another example, eligibility verifier 308 may analyze whether the account associated with user 324 has sufficient funds associated with a wager they want to place.

In some embodiments, during or upon eligibility verifier 308 verifying the eligibility of the request, gaming system 302 may interface with wallet 310, generally corresponding to wallet 210 depicted in FIG. 2A, to determine the balance of, credit, and/or debit an account associated with user 324. For example, in response to a request to determine whether an account associated with user 324 may be credited $20, gaming system 302 may interface with wallet 310 to determine the balance of the account associated with user 324. Wallet 310 may then pass the balance of the account associated with user 324 to gaming system 302.

In some embodiments, gaming system 302 may transmit a communication to remote gaming server 304 through remote gaming server bridge 306. For example, in the event that the initial request asked if an account associated with user 324 had sufficient funds, gaming system 302 may transmit a communication to remote gaming server 304 indicating whether or not the account associated with user 324 has sufficient funds. Upon receiving the communication, remote gaming server 304 may calculate the outcome of the bet, cause an animation to be displayed to user 324 through interface 326, request a debit or credit to an account associated with user 324, and similar actions.

In some embodiments, at any stage in processing the request received from remote gaming server 304, gaming system 302 may interface with event generator 312, generally corresponding to event generator 212 depicted in FIG. 2A, to generate an event associated with the request. For example, an event may be generated that corresponds to the request to verify that user 324 has sufficient funds for a given wager. As such, the generated event may be further utilized by other microservices in gaming platform 300, and/or published by event publisher 314 to data store 316, generally corresponding to event publisher 214 and data store 216 depicted in FIG. 2A, respectively.

Figure 4:
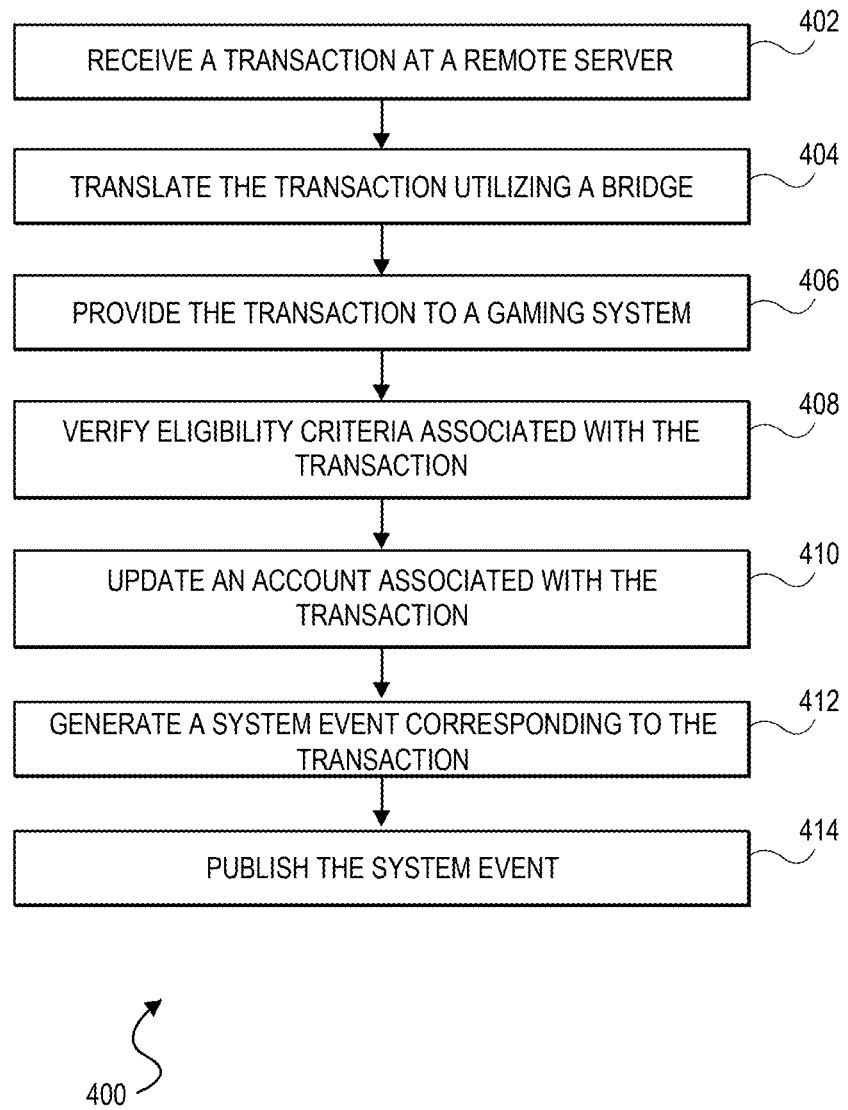
FIG. 4 illustrates an exemplary flow chart in accordance with embodiments of the present disclosure.

Continuing on, FIG. 4 depicts a method 400 for facilitating a transaction between a gaming provider and a system backend in accordance with one or more embodiments of the present disclosure. At step 402, a transaction is received by remote gaming server 304. In some embodiments, the transaction may be received from interface 326 associated with user 324. For example, interface 326 may receive user input indicating that user 324 clicked a GUI component triggering the beginning of a wager made by user 324. The transaction received may be any transaction between a third-party provider and a gaming platform, including, but not limited to, a request to check the balance of an account associated with user 324, a request to credit or debit an account associated with user 324, an indication that a wager has concluded, and the like.

At step 404, the transaction is translated by remote gaming server bridge 306. In some embodiments, the language of the transaction received by remote gaming server 304 is standardized for processing by gaming system 302. For example, the transaction may be translated from a query language understood by remote gaming server 304 to a query language understood by gaming system 302, eligibility verifier 308, wallet 310, and other microservices interfacing with gaming system 302.

At step 406, the transaction is provided to gaming system 302. Gaming system 302 may receive the transaction in order to facilitate the processing of the transaction within the various services of gaming platform 300 and other backend systems. For example, the transaction may be provided to gaming system 302 in order for gaming system 302 to transfer funds to and from an account associated with user 324 based upon the outcome of a wager. For another example, the transaction may be provided to gaming system 302 in order to determine that user 324 is eligible to be participating in the type of wagering they are attempting to participate in.

At step 408, eligibility requirements associated with the transaction are verified. In some embodiments, the eligibility requirements associated with the transaction may be verified by eligibility verifier 308. As discussed above with respect to FIG. 3, any number of eligibility requirements may be verified by eligibility verifier 308 including, but not limited to, the location of user 324, the status of an account associated with user 324, and the like. For example, before indicating that user 324 is able to participate in a wager for $50, eligibility verifier 308 may verify that user 324 has at least $50 in their account.

At step 410, an account associated with the transaction is updated. In some embodiments, gaming system 302 updates the account associated with the transaction by interfacing with wallet 310. Wallet 310 may update the account associated with the transaction by debiting funds, crediting funds, updating the balance of the account, and the like. In some embodiments, as discussed above with respect to wallet 210, wallet 310 may access and update an account associated with user 324 and/or the business deploying gaming platform 300.

At step 412, a system event corresponding to the transaction is generated. In some embodiments, the system event may be generated by event generator 312 before, during, or after gaming system 302 processes the transaction. The system event may be utilized by various microservices attached to gaming system 302 including, but not limited to, a session manager (depicted in FIGS. 2A-2B). The system event may be stored for real-time access during the processing of additional transactions associated with the system event.

At step 414, the system event is published. In some embodiments, as described above, event publisher 314 may publish the system event to data store 316.

Data store 316 may be a singular data store or multiple data stores, as well as an external and/or internal data store. In some embodiments, event publisher 314 publishes the system event to one or more third parties. For example, event publisher 314 may publish the system event to a regulatory agency.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A method for processing, via a gaming platform, third-party specific transactions initiated by a third-party game provider, the method comprising:
receiving, from a remote gaming server by a third-party specific remote gaming server bridge of the gaming platform, a transaction associated with a game provided by the third-party game provider,
wherein the transaction is received in a first language processable by the third-party game provider,
wherein the third-party specific remote gaming server bridge is associated with the third-party game provider;
translating, by the third-party specific remote gaming server bridge, the transaction from the first language to a second language processable by a gaming system of the gaming platform, wherein translating the transaction comprises:
accessing a library comprising one or more components for translating between the first language and the second language;
transmitting, by the third-party specific remote gaming server bridge to the gaming system, the transaction in the second language;
interfacing with, by the gaming system, a plurality of microservices of the gaming platform to initiate the transaction, wherein interfacing with the plurality of microservices comprises:
verifying, by the gaming system via an eligibility verifier, that a plurality of eligibility requirements are satisfied by the transaction;
in response to verifying that the plurality of eligibility requirements are satisfied, updating, by the gaming system, an account associated with the transaction; and
generating, by the gaming system via an event generator, a system event associated with the transaction, wherein the plurality of microservices comprises the event generator and the eligibility verifier.

2. The method of claim 1,
wherein verifying the plurality of eligibility requirements are satisfied by the transaction comprises:
analyzing a location of a user associated with the transaction.

3. The method of claim 1, further comprising:
publishing, by the gaming system via an event publisher, the system event to a data store,
wherein the data store maintains a record of the system event for a predetermined period of time,
wherein the plurality of microservices further comprises the event publisher.

4. The method of claim 3, further comprising:
accessing, by the gaming system and in real time, the data store,
wherein the gaming system accesses the data store to retrieve the system event.

5. The method of claim 3, further comprising:
verifying, by the gaming system via a session manager and using the system event, that a valid session associated with the transaction exists,
wherein the plurality of microservices further comprises the session manager.

6. The method of claim 1, further comprising:
receiving, from the remote gaming server by the third-party specific remote gaming server bridge, the transaction from a user interface associated with a user.

7. The method of claim 1, further comprising:
transmitting, by the gaming system to the third-party specific remote gaming server bridge, an indication of a balance associated with the account before the account is updated.

8. One or more non-transitory computer-readable media comprising computer-executable instructions that, when executed by at least one processor of a gaming platform, perform a method of processing third-party specific transactions initiated by a third-party game provider, the method comprising:
receiving, from a remote gaming server by a third-party specific remote gaming server bridge of the gaming platform, a transaction associated with a game provided by the third-party game provider,
wherein the transaction is received in a first language processable by the third-party game provider,
wherein the third-party specific remote gaming server bridge is associated with the third-party game provider;
translating, by the third-party specific remote gaming server bridge, the transaction from the first language to a second language processable by a gaming system of the gaming platform, wherein translating the transaction comprises:
accessing a library comprising one or more components for translating between the first language and the second language;
transmitting, by the third-party specific remote gaming server bridge to the gaming system, the transaction in the second language;
interfacing with, by the gaming system, a plurality of microservices of the gaming platform to initiate the transaction, wherein interfacing with the plurality of microservices comprises:

verifying, via an eligibility verifier, that a plurality of eligibility requirements are satisfied by the transaction;

in response to verifying that the plurality of eligibility requirements are satisfied, updating, by the gaming system, an account associated with the transaction; and generating, by the gaming system via an event generator, a system event associated with the transaction, wherein the plurality of microservices comprises the event generator and the eligibility verifier.

9. The one or more non-transitory computer-readable media of claim 8, wherein updating the account associated with the transaction comprises at least one of:

depositing a sum into the account; or withdrawing the sum from the account.

10. The one or more non-transitory computer-readable media of claim 8, wherein the account is associated with a user of the game provided by the third-party game provider.

11. The one or more non-transitory computer-readable media of claim 8, wherein the method further comprises:

determining, via a machine learning model of a pendings fixer, a pending transaction to be cleared; and clearing, by the gaming system via the pendings fixer the pending transaction, wherein the plurality of microservices further comprises the pendings fixer.

12. The one or more non-transitory computer-readable media of claim 11, wherein the method further comprises:

voiding, by the gaming system via the pendings fixer, the pending transaction.

13. The one or more non-transitory computer-readable media of claim 8, wherein the method further comprises:

receiving, from a second remote gaming server by a generic remote gaming server bridge of the gaming platform, a second transaction associated with a second game provided by a second third-party game provider, wherein the second transaction is in a third language; and translating, by the generic remote gaming server bridge, the second transaction from the third language to the second language, wherein the remote gaming server is a first remote gaming server, the transaction is a first transaction, the game is a first game, and the third-party game provider is a first-party game provider.

14. A gaming platform for processing a transaction initiated by a third-party game provider, the gaming platform comprising:

a plurality of microservices, the plurality of microservices comprising:

an eligibility verifier verifying that the transaction satisfies a plurality of eligibility requirements;

a wallet accessing and updating an account associated with a user; and an event generator generating a system event corresponding to the transaction;

a gaming system facilitating processing of the transaction, wherein the gaming system is operable to:

interface with the plurality of microservices to initiate the transaction, wherein interfacing with the plurality of microservices comprises:

verifying, via the eligibility verifier, that the plurality of eligibility requirements are satisfied by the transaction;

in response to verifying that the plurality of eligibility requirements are satisfied, update the account associated with the transaction; and generate, via the event generator, the system event associated with the transaction; and a third-party specific remote gaming server bridge associated with the third-party game provider, wherein the third-party specific remote gaming server bridge is operable to:

receive, from a remote gaming server associated with the third-party game provider, the transaction, wherein the transaction is associated with a game provided by the third-party game provider, wherein the transaction is received in a first language processable by the third-party game provider, wherein the third-party specific remote gaming server bridge is associated with the third-party game provider;

translate the transaction from the first language to a second language such that it is processable by the gaming system, wherein translating the transaction comprises:

accessing a library comprising one or more components for translating between the first language and the second language; and transmit, to the gaming system, the transaction in the second language.

15. The gaming platform of claim 14, wherein the third-party specific remote gaming server bridge is further operable to translate a communication transmitted by the gaming system to the remote gaming server from the second language to the first language.

16. The gaming platform of claim 14, wherein the transaction comprises a request to update a balance of the account associated with the user.

17. The gaming platform of claim 14, wherein the plurality of eligibility requirements comprise a minimum balance of the account associated with the user.

18. The gaming platform of claim 14, further comprising:

a data store for storing a record associated with the system event for a predetermined period of time;

wherein the plurality of microservices further comprises:

an event publisher operable to publish the system event to the data store.

19. The gaming platform of claim 18, further comprising:

wherein the plurality of microservices further comprises:

an alert system operable to generating a notification when the plurality of eligibility requirements are unsatisfied.

20. The gaming platform of claim 14, wherein the plurality of microservices further comprises:

a session manager operable to verify a valid session associated with the transaction exists.

* * * * *